US010782026B2

(12) United States Patent
Schulterbrandt

(10) Patent No.: US 10,782,026 B2
(45) Date of Patent: Sep. 22, 2020

(54) APPPARATUS AND METHOD FOR POSITIONING A COOKING INSTRUMENT

(71) Applicant: Takisha Schulterbrandt, Clarksville, MD (US)

(72) Inventor: Takisha Schulterbrandt, Clarksville, MD (US)

( * ) Notice: Subject to any disclaimer, the term of this patent is extended or adjusted under 35 U.S.C. 154(b) by 145 days.

(21) Appl. No.: 15/974,692

(22) Filed: May 9, 2018

(65) Prior Publication Data
US 2019/0346146 A1 Nov. 14, 2019

(51) Int. Cl.
*H05B 6/12* (2006.01)
*F24C 15/10* (2006.01)
*F24C 7/08* (2006.01)
*G08B 5/36* (2006.01)
*G03B 21/20* (2006.01)

(52) U.S. Cl.
CPC .......... *F24C 7/083* (2013.01); *G03B 21/2033* (2013.01); *G03B 21/2046* (2013.01); *G08B 5/36* (2013.01)

(58) Field of Classification Search
CPC .............. H05B 1/0266; H05B 3/74–78; H05B 6/062–065; H05B 6/12–1281; F24C 15/10–108
See application file for complete search history.

(56) References Cited

U.S. PATENT DOCUMENTS

| 4,240,721 | A | * | 12/1980 | Drop, Sr. ............... | G03B 21/10 353/119 |
| 5,588,216 | A | * | 12/1996 | Rank ...................... | G01B 11/27 33/286 |
| 6,334,684 | B1 | * | 1/2002 | Yoshida ................ | G03B 21/001 353/28 |
| 6,531,966 | B2 | | 3/2003 | Krieger | |
| 8,169,404 | B1 | * | 5/2012 | Boillot .................... | G06F 3/017 345/156 |
| 8,870,392 | B2 | * | 10/2014 | Kleinert .................. | D06F 34/28 353/119 |
| 9,109,803 | B2 | * | 8/2015 | Motabar ................. | F24C 15/10 |
| 10,482,315 | B2 | * | 11/2019 | Aso ..................... | G06K 9/00671 |
| 2006/0232997 | A1 | * | 10/2006 | Rosenbauer ........ | A47L 15/4293 362/621 |
| 2009/0040090 | A1 | * | 2/2009 | Hahn ...................... | F24C 7/083 341/173 |
| 2009/0262098 | A1 | * | 10/2009 | Yamada ................ | G06F 1/1616 345/175 |
| 2010/0182136 | A1 | * | 7/2010 | Pryor .................... | G01F 23/292 340/425.5 |

(Continued)

FOREIGN PATENT DOCUMENTS

EP 2542139 * 6/2015

OTHER PUBLICATIONS

English translation of EP 1272007 to Staebler (Year: 2003).*

*Primary Examiner* — Michael A Laflame, Jr.
(74) *Attorney, Agent, or Firm* — Kofi A. Schulterbrandt

(57) ABSTRACT

The present invention discloses an apparatus and method for flagging a location on an object with a light image so that when a line of sight of the object is later obstructed, the light flagged location is known available to be utilized. A light is projected onto a cooktop to flag a burner location in order to use that location for centering of a pot over on burner when the pot being placed on the burner obstructs the line of sight of the cook to the burner.

20 Claims, 4 Drawing Sheets

(56) References Cited

U.S. PATENT DOCUMENTS

| | | |
|---|---|---|
| 2010/0231506 A1 | 9/2010 | Pryor |
| 2011/0253693 A1* | 10/2011 | Lyons ............... A47J 27/00 |
| | | 219/209 |
| 2012/0132191 A1* | 5/2012 | Cadima ............. F24C 3/085 |
| | | 126/39 R |
| 2013/0187781 A1 | 7/2013 | Bach |
| 2013/0270251 A1* | 10/2013 | Furuti ............... F24C 7/083 |
| | | 219/445.1 |
| 2014/0041649 A1 | 2/2014 | Sinur |
| 2014/0210793 A1* | 7/2014 | Eriksson ............ G06F 1/169 |
| | | 345/175 |
| 2016/0054007 A1 | 2/2016 | Rieger |
| 2016/0296056 A1 | 10/2016 | Vanci |
| 2017/0023260 A1* | 1/2017 | Charpentier ...... C03C 10/0027 |
| 2017/0321905 A1* | 11/2017 | Buriola ............. F24C 15/2064 |
| 2017/0348854 A1* | 12/2017 | Oleynik ............. B25J 9/1605 |
| 2019/0274192 A1* | 9/2019 | Fryshman ........... H05B 6/06 |
| 2019/0301745 A1* | 10/2019 | Neal ................. F24C 15/10 |
| 2020/0041346 A1* | 2/2020 | Funk ............... H05K 7/20972 |

\* cited by examiner

APPPARATUS AND METHOD FOR POSITIONING A COOKING INSTRUMENT

BACKGROUND OF THE INVENTION

A typical cooking instrument such as a stove may include multiple burners on a cook top. The burners generate cooking heat and are positioned in various locations on or in the general plane of the cooktop. When placing a cooking implement (e.g., a pot or pan) on a burner, a user may want to ensure that the cooking instrument is perfectly centered on the burner or as close to perfect as possible. For example, perfect centering enables food to cook more evenly.

One of the challenges of such a centering process is that centering generally requires the user to be able to see the burner as the center of the pot is being adjusted to coincide with the center of the burner. This is especially true for large pots where the larger the pot, the harder to center. Unless the cooking instrument is transparent, as soon as any portion of the cooking instrument is placed over the burner, the user faces challenges seeing both the instrument and the burner simultaneously. Therefore, it becomes more difficult for the user to adjust or superimpose the center position of the implement to coincide with center of the burner and would have to guess as to the accuracy of the centering.

It would be beneficial to develop a mechanism, method, or system for aiding a user to more accurately center a cooking instrument on a burner. Specifically, it would be beneficial to develop a system for flagging (e.g., visually) a center position of a burner and to visually project that flagged image onto the cooktop and/or to the cooking instrument so that (when placing a cooking instrument) the user can adjust the center position of the cooking instrument to the projected, flagged center position.

SUMMARY OF THE PRESENT INVENTION

The present invention discloses an apparatus for projecting a directed light source toward and/or onto a location in order to flag such location. When the location is no longer visible the flagging light source continues to direct light and remains visible to tell the user where the location is. For example, a portion of a burner on a cooktop is flagged by directing a light image thereon. When a pot or cooking instrument is being placed on a burner, the pot inevitably blocks the cook's view of the burner. The cook is then unable to judge whether the cooking instrument is placed centrally on the burner. However, since the light image projected on the pot flags the location of the burner, centering that image relative to the pot centers the pot on the burner.

DETAILED DESCRIPTION OF THE PREFERRED EMBODIMENTS

Figure 1:
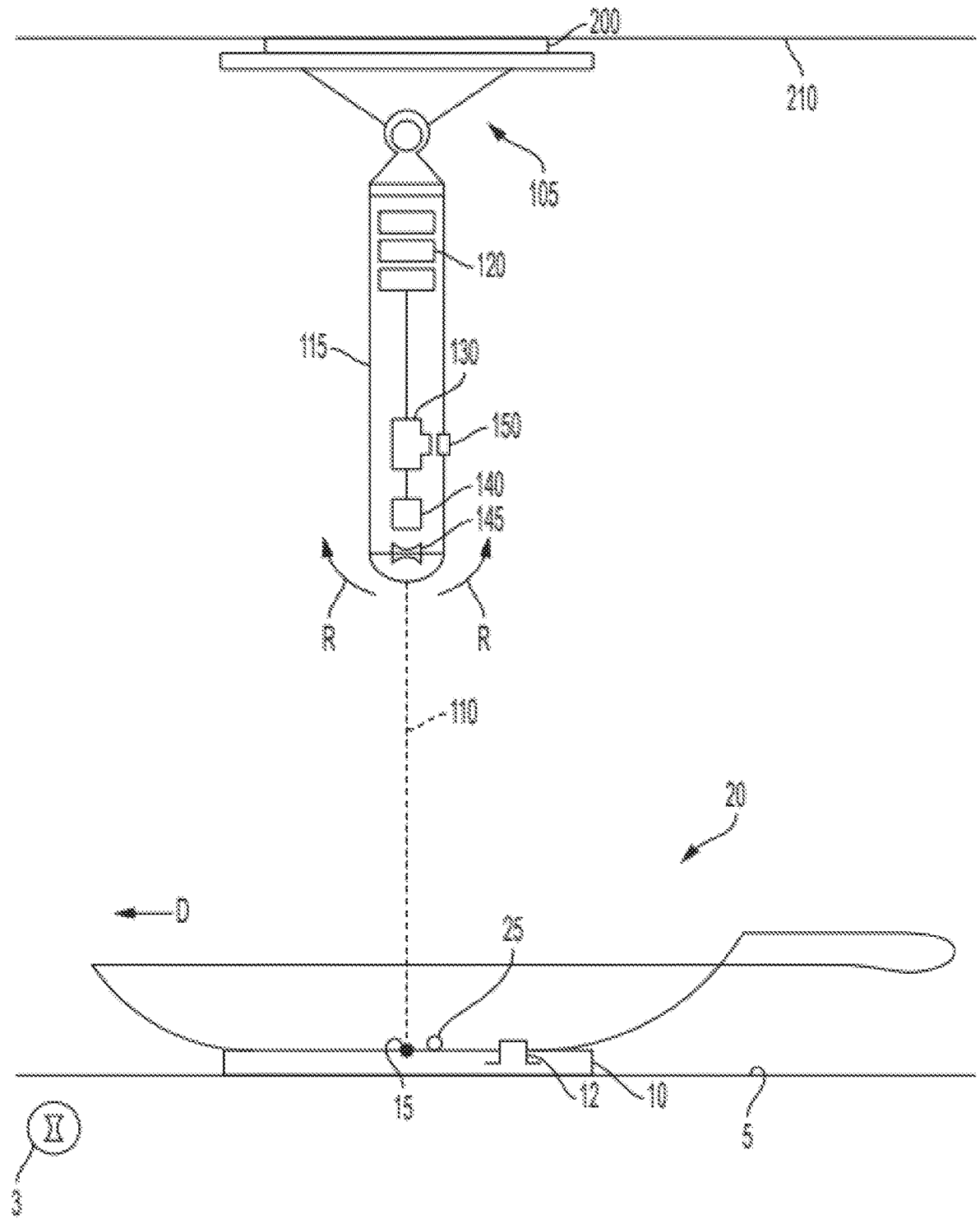
FIG. 1 shows an image of the cooking instrument positioner of the present invention.
Figure 2:
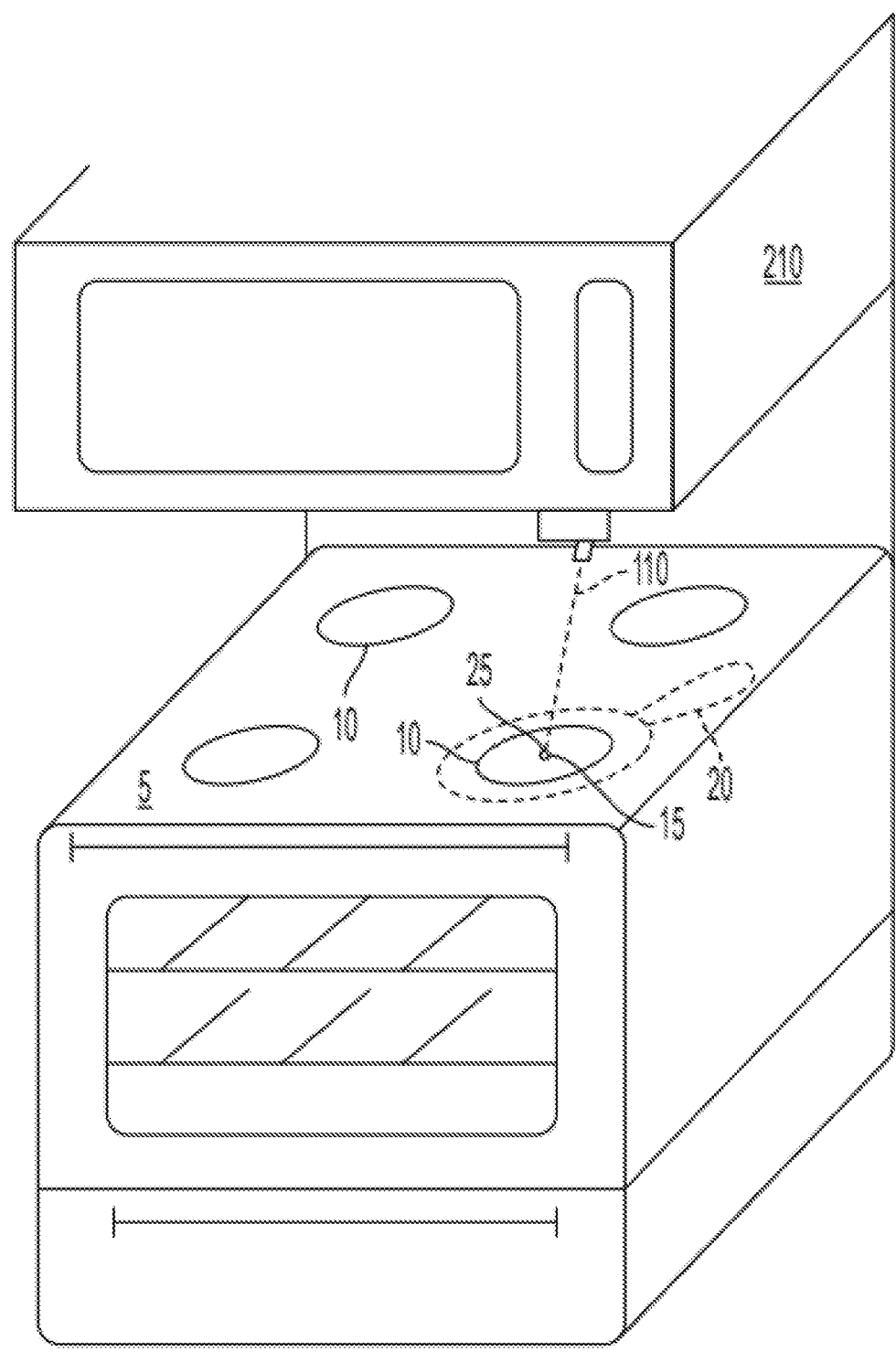
FIG. 2 shows a cooktop and the apparatus of claim 1 supported from a microwave of the cooktop and directing a light toward a burner of the cooktop.

FIGS. 1 and 2 show a cook top 5 including a burner 10 thereon and a center location 15 of the burner. A cooking instrument such as a pot is also shown at 20 with a pot center shown at 25. A light emitter 100 is shown supported from a kitchen structure 210 via a pivotable base 105. Pivot base 105 may include a connection element 200. Connection element 200 may include at least one of temporary connector (e.g., an adhesive or a magnet) or a permanent connector (e.g., a mechanical connection such as a (e.g. a rivet or threaded member)). Other suitable connection means may be employed. Pivotable base 105 may also include a ball and socket or other pivotable element such as a bendable memory element (e.g., metal) that holds a selectable bent configuration and that allows light emitter 100 to supportably pivot relative to kitchen structure 210 so that a user may selectively direct a light stream 110 in a variably selectable direction R. Direction R includes any and all 3D polar positions about pivotal base 105 and kitchen structure 210 may be an appliance or a kitchen wall or a ceiling.

In the embodiment of FIG. 1, light emitter 100 includes a housing 115. Inside housing 115 may be a power supply such as a battery 120, may include a control switch 130 actuated by a button 150, and may include a light emitter 140 and a lens 145 for focusing the light directed from light source 100. Battery 120 may be replaced with another source of power (e.g., hard wired power from a house wall socket or from cooktop 5).

Control switch 130 may be controlled by a button 150 on the light emitter, or a button 12 on cook top 5 when the system is integrated into cooktop 5. Furthermore, switch 130 could be triggered by a turn of the burner ignition knob 3. Specifically, control switch 130 which may be onboard light emitter 100 or may be on cooktop 5 or remote from the light emitter 100. Switch 130 of the positioner of the present invention may also include button 150 such that one button depression turns on light source 100 and release of button 150 stops light source 100. In another embodiment, a depression of button 150 closes switch 130 the light source 100 remains on after release. A subsequent button depression turns light source 100 off and it remains off after release.

Figure 3A:
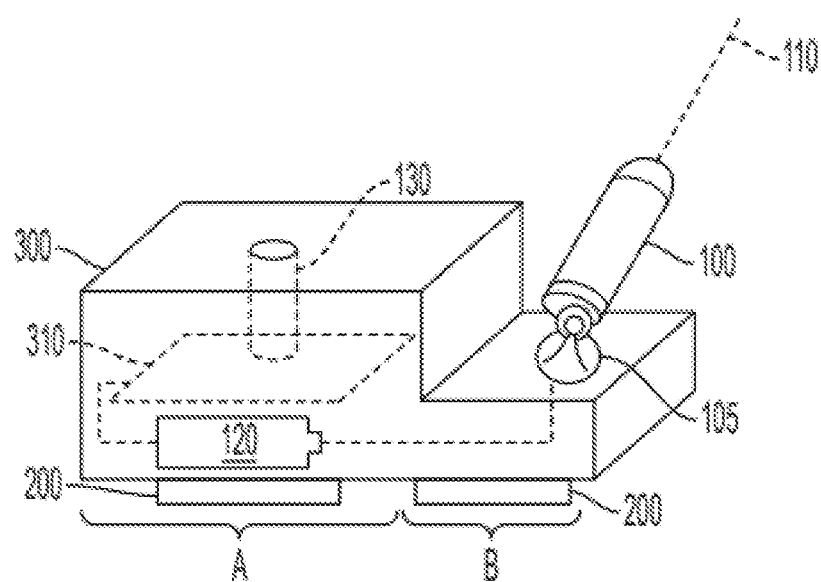
FIG. 3A shows a first arrangement of the present invention of FIG. 1 with the control supported independently from the light source.

Switch 130 may also include or be replaced by a voice activator or a proximity sensor. FIG. 3A shows an embodiment of the present invention positioner including a housing 300. Housing 300 is attachable to a kitchen structure 210 (not shown) via connection element 200 and may include a proximity sensor module 310. Proximity sensor 310 may be for example, a capacitive sensor switch or an IR sensor switch. Module 310 controls the flow of power from a battery or hardwire to light source 100. For example, the motion of a users hand or motion of a pot might energize the light source 100. Housing 300 has a portion A which may contain the switch 130 (e.g., a proximity sensor 310), battery 120 and other control circuitry. A portion B of the positioner of FIG. 3A may include pivot mechanism 105 that enables light source 100 to direct light beam 110 in a continuum of 3D polar directions. Portion A and portion B are shown connected, but may be separable in order to position light source 100 in sight of burner 10 while placing switch 130 in a convenient place for control by a user/cook.

Figure 3B:
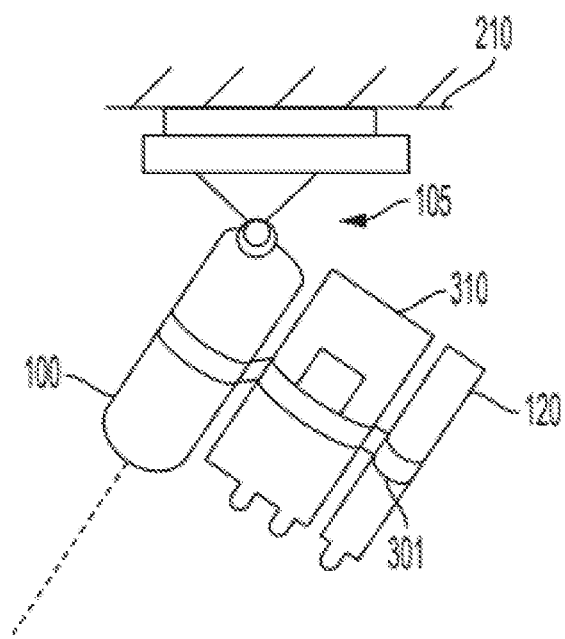
FIG. 3B shows a second arrangement of the present invention of FIG. 1 with the control supported on the light source.

FIG. 3B shows an embodiment of the positioner of claim 1 which further includes a proximity sensor module 310 (e.g., an IR sensor module) connected to and supported from light source 100. In this embodiment, a base 105 which (as discussed above) is connectable to kitchen structure 210 includes a pivot member 105 and both light source 100, sensor module 310, and battery 120 pivot together relative to kitchen structure 210. A housing such as a plastic housing 305 may secure each (i.e., light source 100, sensor module 310, and battery 120) together for pivoting by pivot member 105.

Figure 4B:
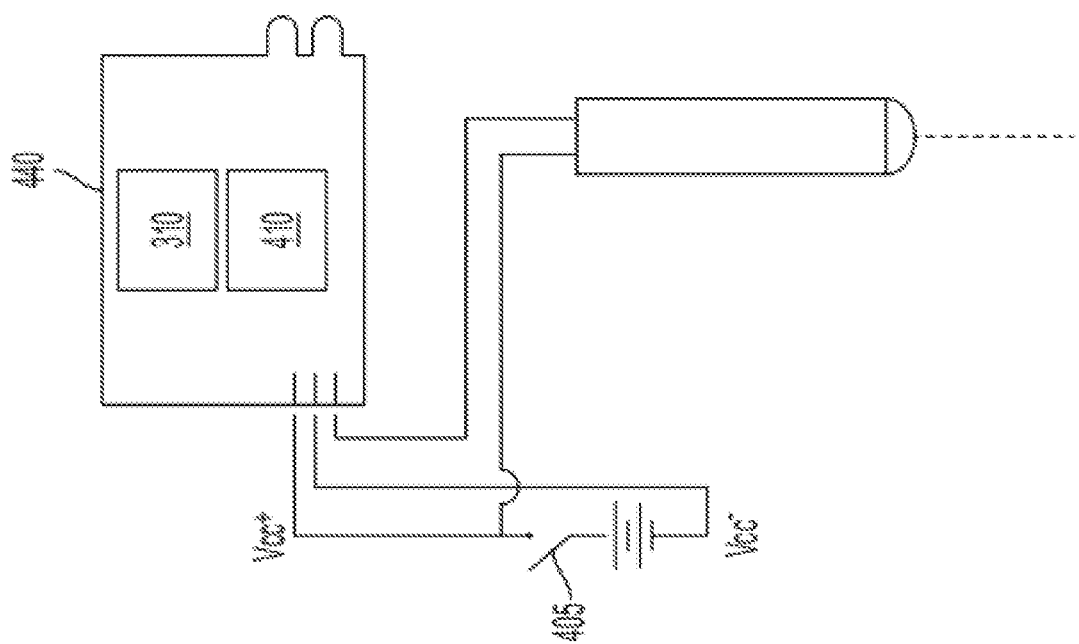
FIG. 4B shows an example electrical schematic of the apparatus of FIG. 1 including a module which combines a proximity sensor module and a timer module.
Figure 4A:
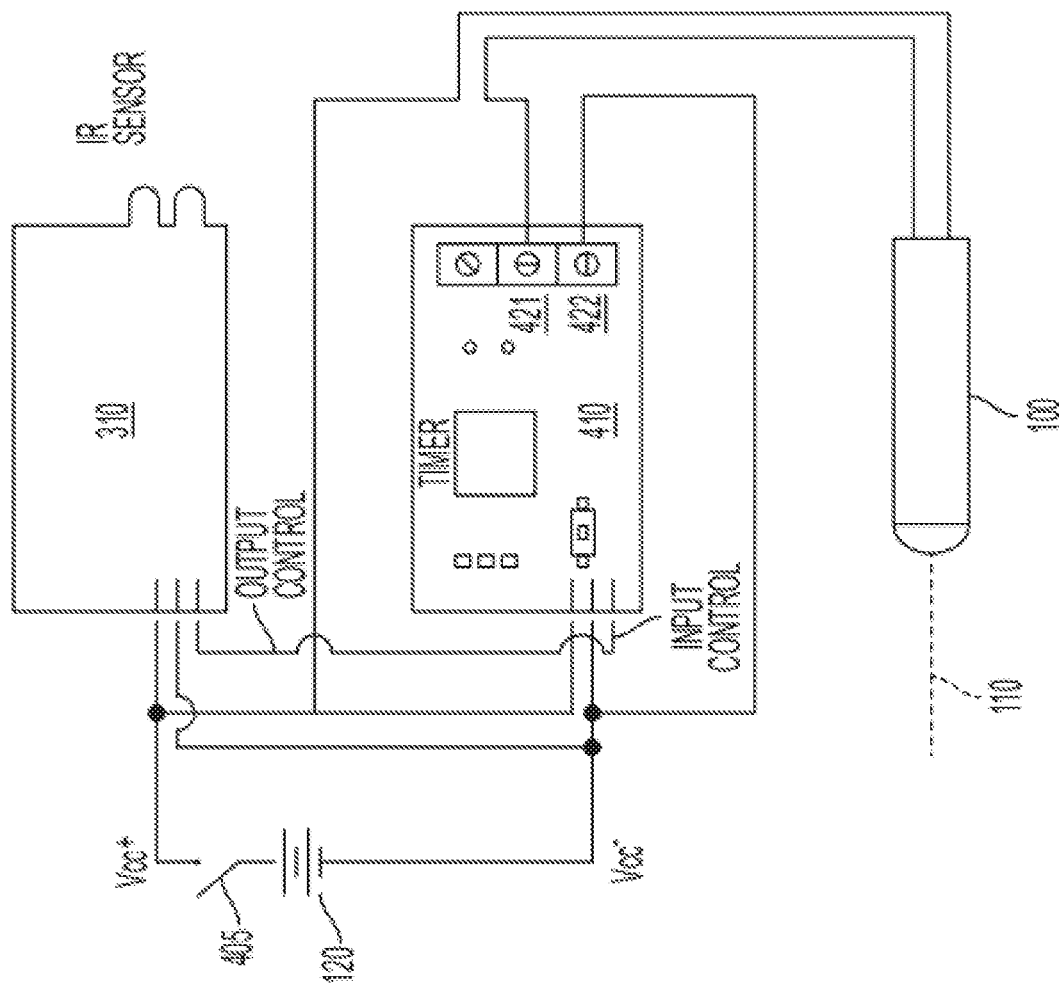
FIG. 4A shows an example electrical schematic of the apparatus of FIG. 1 including a proximity sensor module and a timer module.

The duration of time in which light source 100 is energized may also be controlled by employing a timer as shown in FIG. 4A between switch 130 and/or 310 and the light source 100 to control the supply of power therebetween. For example, a button 150 depression or sensed movement may energize light source 100 for a predetermined period (e.g., 30 seconds) to give a user sufficient time to accurately position cooking instrument 20 on burner 10.

In order for Proximity sensor 310 to be continuously ready to sense a cooking activity (such as a movement of a pot or a wave of a hand of a cook), it uses a small continuous amount of power. When both Switch 130 and sensor switch 310 are simultaneously employed, switch 130 may be employed as a master switch 405 which opens between battery 120 and sensor switch 310 to control power to censor switch 310. The ability of master switch 405 to cut off power to sensor switch 310 preserves battery power.

As mentioned above, the light source controller may be dependent on a sensor which senses the presence of the hand of a cook or senses the presence of a cooking implement 20. FIG. 4A shows a proximity sensor module 310. Proximity sensor electronic module 310 receives power from battery 120 and outputs a high output control signal when movement of an object (e.g., a pot or a hand) is detected. Timer relay module 410 (i.e., widely commercially available) receives an input control signal from proximity sensor module 310 to tell the normally open terminals 421 and 422 of timer 410 to close. The closed circuit allows the light source/laser circuit to be complete in order to energize laser light source 100 for a period of time (e.g., 10 seconds).

In another embodiment shown in FIG. 4B, a single sensor delay module 440 includes the elements of both sensor 310 and timer 410 to control light source 100. The modules 310, 410, and 440 include electronic elements such as resistors, capacitors, diodes, transistors, and relay coils in addition to any proximity sensing elements.

Alternatively, the cooktop 5 or specifically the burner 10 may include a button 12 which when depressed by cooking instrument 20 sends a signal to power light source 100 at least for a predetermined period. Other types of proximity sensors besides IR sensors, or capacitive sensors may be used to detect the presence of cooking implement 20 on the burner 10.

Light emitter 140 may be a diode or other light-emitting element and may include a lens 145 through which emitted light 110 passes before projecting the centering image 15. The light emitter 140 may be of any kind (e.g., laser) so long as the visual indication projected is effective to identify/locate/specify a particular position/location.

In use, a user places a cooking instrument 20 on burner 10. Because cooking instrument 20 may be significantly larger than burner 10, as soon as a cooking instrument 20 cuts off a portion of a user's line of sight to burner 10, the user has diminished ability to center cooking instrument 20 on burner 10. This is so because the best way to ensure a relative centering between cooking instrument 20 and burner 10 is to view them simultaneously while positioning them centrally. Again, because in the process of placing cooking instrument 20, cooking instrument 20 obstructs a users line of sight to burner 10, the user is unable to see both simultaneously.

To over come this impediment, before placing cooking instrument 20, the user directs light stream 110 at burner center 15 (e.g., by triggering a proximity sensor with the wave of a hand). Light 110 projects a visual indication onto a center location of burner 10 (e.g., for 10 seconds then goes off). The visual indication may be a dot or some other shape or form that when projected onto the cooking instrument aids the user in positioning cooing instrument 20. Now when cooking instrument 20 is placed over burner 10, the visual indication appears on cooking instrument 20, but in the same location as the center of burner 10. The visual light indicator directed on the cooking instrument therefore represents an actual location of the center of burner 10. The user can then judge the actual center of cooking implement 20 and adjust the position of cooking instrument 20 (e.g., in a direction D) until the light representing the visually indicated burner center corresponds with the perceived center of cooking instrument 20. Alternatively, a marking or indicia representing a center of the cooking implement 20 may be placed thereon. In that case, the position of cooking instrument 20 would be adjusted until a location of the visual indicator coincides with the light indicia.

The arrangement of the basic elements may be varied. As discussed above the basic elements include a power source, a light source (e.g., a laser) and an electronic controller which controls the flow of power to the laser. The controller may include one or more of a switch, a proximity sensor, and a timer. The basic elements also include a pivot support for selectively and supportingly aiming the light source. If the positioner of the present invention is incorporated/integrated into an appliance, the light source or laser may be permanently positioned to direct a centering image so that no pivotal adjustment is necessary. Any of these basic elements may be rearranged. For example, the laser may be separated from the switch by hard wire or by wireless control. The switch may be supported on the light source or the switch may be remote from the light source.

Furthermore, the invention contemplates incorporation of one or more of the basic elements into a cooktop. For example, a microwave with a built in light source, switch control system, or power source as might be included by an appliance manufacturer.

The invention claimed is:

1. A cooking instrument comprising: a cooktop including a burner with a heat source, the burner including a center; a light source distant from the cooktop, the light source projecting a directed image at the cooktop; and wherein the image is projected at a location on the cooktop that corresponds to the center of the burner and the image aids a user in accurately positioning a cooking implement on the burner relative to a center of the burner even when the cooking implement blocks a line of sight to at least a portion of the burner during placement of the cooking implement on the burner; and wherein the light source is pivotable relative to the cooktop to allow the user to adjust a direction of projection of the directed image.

2. The cooking instrument of claim 1, wherein the image directed at the cooktop is directed onto the cooktop.

3. The cooking instrument of claim 1, wherein the light source is supported from a location in a vicinity of the cooktop.

4. The cooking instrument of claim 1, wherein the cooking instrument further includes a sensor; and wherein the sensor senses a presence of the cooking implement in proximity to the burner and directs the light source to project the directed light image toward a center of the burner.

5. The cooking instrument of claim 1, wherein a laser is the source of the projected directed image.

6. The cooking instrument of claim 1, wherein the cooking instrument includes a plurality of light sources each directing an image onto the cooktop.

7. The cooking instrument of claim 1, further including a switch and a timer, wherein when the switch is closed the timer energizes the light source for a predetermined period of time.

8. The cooking instrument of claim 1, wherein the direct image is projected onto a pot.

9. A cooking apparatus comprising: a pot; a cooktop including a burner on which the pot is to be placed; the burner including a heat source, the burner further including a center; a light source distant from the cooktop, the light source projecting a directed image at the cooktop; and wherein the image is projected at a location on the cooktop that corresponds to the center of the burner, the directed image projecting onto the pot and the image aids a user in accurately positioning a pot on the burner relative to a center of the burner even when the cooking implement blocks a line of sight to at least a portion of the burner during placement of the cooking implement on the burner.

10. The cooking instrument of claim 9, wherein the light source is pivotable relative to the cooking instrument to allow the user to adjust a direction of projection of the image.

11. A cooking apparatus comprising: a cooktop including a visible burner on which the pot is to be placed; the visible burner including a heat source, the visible burner further including a center; a light source distant from the cooktop, the light source projecting a directed image at the cooktop; and wherein the image is projected at a location on the cooktop that corresponds to the center of the visible burner, the directed image projecting onto the pot and the image aids a user in accurately positioning a pot on the visible burner relative to a center of the visible burner even when the cooking implement blocks a line of sight to at least a portion of the visible burner during placement of the cooking implement on the burner;
wherein the light source is pivotable relative to the cooktop to allow the user to adjust a direction of projection of the image.

12. The cooking instrument of claim 11, wherein the image directed at the cooktop is directed onto the cooktop.

13. The cooking instrument of claim 11, wherein the light source is supported from a location in a vicinity of the cooktop.

14. The cooking instrument of claim 11, wherein the cooking instrument further includes a sensor; and wherein the sensor senses a presence of the cooking implement in proximity to the burner and directs the light source to project the directed light image toward a center of the burner.

15. The cooking instrument of claim 11, wherein a laser is the source of the projected directed image.

16. The cooking instrument of claim 11, wherein the cooking instrument includes a plurality of light sources each directing an image onto the cooktop.

17. The cooking instrument of claim 11, further including a switch and a timer, wherein when the switch is closed the timer energizes the light source for a predetermined period of time.

18. The cooking instrument of claim 9, wherein the image directed at the cooktop is directed onto the cooktop.

19. The cooking instrument of claim 9, wherein the light source is supported from a location in a vicinity of the cooktop.

20. The cooking instrument of claim 9, wherein the cooking instrument further includes a sensor; and wherein the sensor senses a presence of the cooking implement in proximity to the burner and directs the light source to project the directed light image toward a center of the burner.

* * * * *